(12) United States Patent
Mencos (10) Patent No.: US 10,274,121 B2
(45) Date of Patent: Apr. 30, 2019

(54) PIPE FITTINGS ALLOWING NON-DESTRUCTIVE PRESSURE TESTING OF INTEGRITY OF SEALS

(71) Applicants: PROPER PIPE EHF., Reykjanesbaer (IS); Ruben Adolfo Mencos, Reykjavik (IS)

(72) Inventor: Ruben Mencos, Reykjavik (IS)

(*) Notice: Subject to any disclaimer, the term of this patent is extended or adjusted under 35 U.S.C. 154(b) by 122 days.

(21) Appl. No.: 14/910,983

(22) PCT Filed: Aug. 8, 2014

(86) PCT No.: PCT/IS2014/050007
§ 371 (c)(1),
(2) Date: Feb. 8, 2016

(87) PCT Pub. No.: WO2015/019367
PCT Pub. Date: Feb. 12, 2015

(65) Prior Publication Data
US 2016/0186910 A1    Jun. 30, 2016

(30) Foreign Application Priority Data
Aug. 8, 2013 (IS) .......................................... 050059

(51) Int. Cl.
*F16L 47/03* (2006.01)
*F16L 55/00* (2006.01)
(Continued)

(52) U.S. Cl.
CPC ............ *F16L 55/00* (2013.01); *B29C 65/342* (2013.01); *B29C 65/3432* (2013.01);
(Continued)

(58) Field of Classification Search
CPC .................................. F16L 47/03; F16L 47/02
(Continued)

(56) References Cited

U.S. PATENT DOCUMENTS 4,571,488 A    2/1986   Reeves
4,655,480 A *  4/1987   Thalmann ............... F16L 47/03
                                                      285/21.2
(Continued)

FOREIGN PATENT DOCUMENTS

CN    202937947 U    5/2013
DE    20213972 U1    1/2003
(Continued)

OTHER PUBLICATIONS

International Search Report and Written Opinion of International Application No. PCT/IS2014/050007, Proper Pipe EHF, filed Aug. 8, 2014.
International Search Report and Written Opinion of International Application No. PCT/US2016/016851, Proper Pipe EHF, filed Feb. 5, 2016.

*Primary Examiner* — David Bochna
(74) *Attorney, Agent, or Firm* — Katz Law Group, LLC; Gary Katz (57) ABSTRACT

Fittings to join and tightly seal tubes such as plastic tubes used in but not limited to various plumbing applications. The fittings allow for rigorous and non-destructive tests of the integrity of seals, where the integrity of seals can be readily and quickly tested one by one, as a pipe system is being built. The seals can also be tested again, after installation and completion of the plumbing arrangement. The fitting comprises two pairs of sealing zones, each pair having in between sealing zones a pressure testing chamber with an inlet, which allows for pressurizing the chamber and testing the integrity of the adjacent seals. The fittings have a series of cold zones that enhance flexibility and integrity of the fittings.

12 Claims, 6 Drawing Sheets

(51) Int. Cl.
  *B29C 65/34*   (2006.01)
  *B29C 65/00*   (2006.01)
  *G01M 3/28*    (2006.01)
  *F16L 47/30*   (2006.01)
  *B29C 65/82*   (2006.01)
  *B29C 65/20*   (2006.01)
  *B29C 65/06*   (2006.01)

(52) U.S. Cl.
  CPC ........ *B29C 65/8246* (2013.01); *B29C 66/112* (2013.01); *B29C 66/114* (2013.01); *B29C 66/1122* (2013.01); *B29C 66/131* (2013.01); *B29C 66/232* (2013.01); *B29C 66/5221* (2013.01); *B29C 66/5224* (2013.01); *B29C 66/5229* (2013.01); *B29C 66/52231* (2013.01); *B29C 66/52241* (2013.01); *B29C 66/52296* (2013.01); *F16L 47/03* (2013.01); *F16L 47/30* (2013.01); *G01M 3/2853* (2013.01); *B29C 65/06* (2013.01); *B29C 65/20* (2013.01); *B29C 65/3468* (2013.01); *B29C 65/3476* (2013.01); *B29C 66/71* (2013.01)

(58) Field of Classification Search
  USPC ........................................................ 285/21.2
  See application file for complete search history.

(56) References Cited

U.S. PATENT DOCUMENTS

| | | | | |
|---|---|---|---|---|
| 4,703,150 A | * | 10/1987 | Kunnecke | F16L 47/03 219/535 |
| 4,869,533 A | * | 9/1989 | Lehmann | F16L 47/03 285/21.2 |
| 5,150,922 A | * | 9/1992 | Nakashiba | F16L 47/03 285/21.2 |
| 5,182,440 A | * | 1/1993 | Dufour | F16L 47/03 285/21.2 |
| 6,394,502 B1 | * | 5/2002 | Andersson | F16L 47/03 285/21.2 |
| 7,259,684 B1 | | 8/2007 | Manakkal | |

FOREIGN PATENT DOCUMENTS

| | | |
|---|---|---|
| DE | 102010029715 A1 | 12/2011 |
| EP | 0416451 A2 | 3/1991 |
| EP | 0679831 A2 | 11/1995 |
| GB | 2391598 A | 2/2004 |
| WO | 2013/136062 A1 | 9/2013 |
| WO | 2015/019367 A1 | 2/2015 |

\* cited by examiner

PIPE FITTINGS ALLOWING NON-DESTRUCTIVE PRESSURE TESTING OF INTEGRITY OF SEALS

FIELD OF THE INVENTION

The present invention relates to pipe fittings and a testing device and system for testing the quality and integrity of the fusion seals made by electrofusion or other sealing methods between two pipes in a non-destructive manner.

BACKGROUND OF THE INVENTION

Polyethylene (PE) is commonly used in manufacturing plastic pipes for gas and water supply, where high density polyethylene (HDPE) is the most common ingredient. When laying PE pipes or fixing ruptured or broken pipes, the PE pipes are typically joined using fusion welding such as butt fusion, electrofusion or hot iron fusion.

In general an electrofusion fitting comprises tubular openings adapted to receive a pipe to be connected to the fitting. An electrofusion element is arranged in the tubular opening at the inner surface to be adjacent to the outer surface of the pipe which is inserted into the fitting. A common electrofusion element consists of an electrical heating coil of resistance wire positioned some distance into the fitting and ending well before the receiving end of the joining zone of the fitting, which can be marked by some sort of rib or edge. The coil is connected to contacts for supplying electric current to the electrical heating coil. When the coil is energised, the plastic materials of the pipe and the fitting adjacent the electrofusion element melt and fuse. The thickness of both the pipe and the fitting and amount of heat is arranged such that only the inner surface of the fitting and the outer surface of the pipe melt.

Welded joints of PE pipes are however not always successful for reasons such as welding errors. Welding errors may occur due to faults in cutting the pipes, lack of- or poor scraping, particles (debris) in the welding zone, positioner problems, humidity, incorrect welding parameters, etc. A simple and secure way of testing if the joints are successfully welded is desired.

Other types of piping material such as acrylonitrile butadiene styrene (ABS), polypropylene (PP), polyvinylidene fluoride (PVDF) and polyvinyl chloride (PVC) are used for different purposes, but fittings to join these pipe types are typically different.

EP 1396672 A1 discloses certain embodiments of electrofusion.

WO 2013/136062 discloses electrofusion nipple fittings (internal fittings) for joining together two pipe sections in particular for metal pipes lined with PE pipes, that allow the integrity of the weldings to be tested It would be appreciated to have further methods for joining and sealing pipes and testing rigorously and quickly the integrity of the seals in a non-destructive manner.

SUMMARY OF THE INVENTION

The fittings and the test system of the present invention provide a solution for testing the fusion of joined pipes, which have been joined and fused e.g. by welding by electrofusion. The tests of the invention are non-destructive tests (NDT). The fittings can be tested in this way one by one, as they are completed, without the need to pressure test the entire pipe system, as is usually done in the art.

The fitting of the invention allows for rigorous testing of seal integrity, meaning that high pressure (e.g. 1-10 bar (0.1-1 MPa; 14-140 psi)) can be applied to the pressure test chambers adjacent to seals. The seals can conveniently be tested as a system is being put in place; after seals of a particular fitting have been welded to connecting tubes and allowed to cool, the can be tested, before or while the next connecting fitting is put in place. This means that each welding-cooling-testing cycle takes only about 12-15 minutes. A further advantage is that the seals can be tested at any time after completion of the system, such as many years later. By exposing the fitting the inlets to pressure chambers are again available for non-destructive testing, without the need to shut down the system or open the system itself.

Thus, the invention provides with the pressure testing chambers described herein rigorous active NDT; means to test repeatedly as often as desired, allowing for efficient monitoring and maintenance of a plumbing system.

The fitting provided by the present invention is a tubular fitting (straight or bent, such as straight sleeve or knee joint), preferably made from weldable plastics, to join at least two pipes. The main tubular fitting part is referred to as a sleeve, and the sleeve has at each of is opposite ends two circular sections referred to herein as sealing zones to form by each end a pair of circular sealing joints between an inserted pipe end and the sleeve. The sealing zones comprise sealing means to form a seal with an inserted tube end. In case of electrofusion, at least one of the circular sections comprises an electrofusion coil section or a so called electrical heating coil and the seal is formed by supplying electric current to the electrical heating coil, producing heat in sufficient and suitable amount to melt the plastic internal surface of the fitting in the sealing zone and the inserted pipe so as to form a tight seal. The sleeve further comprises a space which functions as a pressure testing chamber, at each end, for testing the fusion between the sleeve and each respective pipe end. Each pressure testing chamber is formed as a space along the interior circumference of the sleeve, in between the two circular seals in each respective pair of sealing zones and has an inlet which is typically arranged with a valve, or the valve can be part of a separate unit for pressurising and testing the tightness of the pressure chamber. The inlet and optional valve are arranged on the outer surface of the sleeve between the two sealing zones. The pressure testing chamber is formed by a space formed within the fitting, between the inner surface of the sleeve and the outer surface of the pipe, preferably by a circumferential groove in the inner surface of the sleeve.

In a first aspect of the invention, a fitting is provided for joining together with a tight seal at least two pipe sections. The fitting comprises a hollow tubular main body with opposite tubular sleeve openings, wherein a first tube end of a first tube and a second tube end of a second tube can be inserted in the respective opposite tubular sleeve openings. The fitting further comprises a first pair of circumferential sealing zones comprising a proximal sealing zone and a distal sealing zone, for sealing said first tube end to the fitting, and a second pair of circumferential sealing zones comprising a proximal sealing zone and a distal sealing zone, for sealing said second tube end to the fitting. The sealing zones thus encircle the inner surface of the tubular sleeve.

In between the first pair of sealing zones is arranged a first circumferential pressure chamber, having an inlet, which can be used to test the integrity of seals formed by said first pair of sealing zones. In between the second pair of circumferential sealing zones is arranged a second pressure chamber, having an inlet, which can be used to test the integrity of seals in said second pair of sealing zones.

Figure 6:
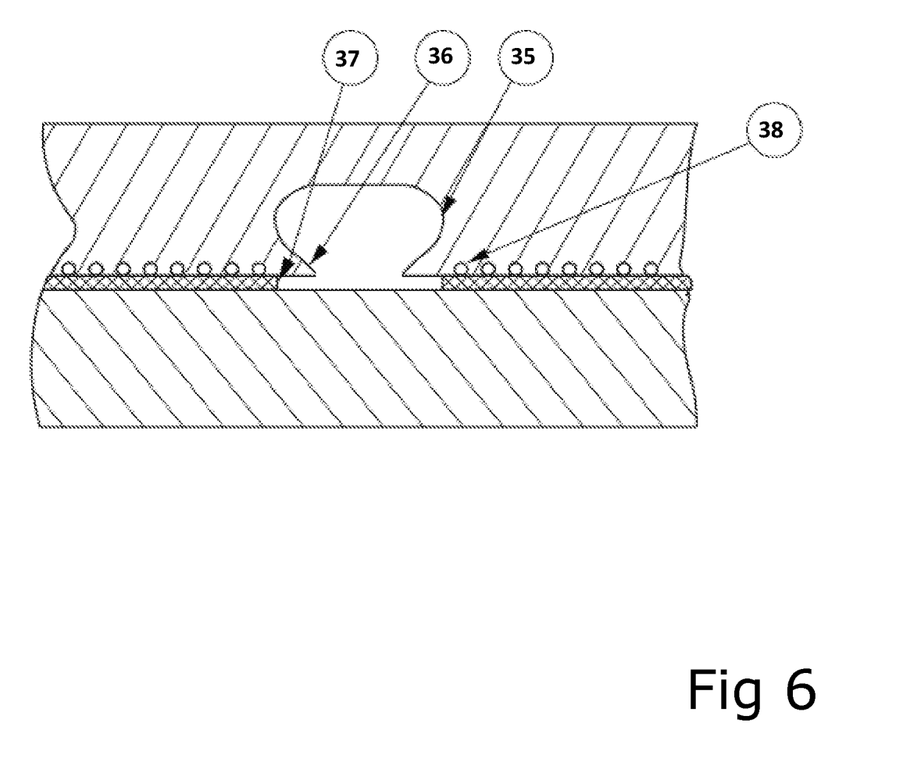
FIG. 6 shows a cross-section of a pressure testing chamber with "omega" shape.

The pressure chamber can have the shape of a simple groove, carved out from the inner surface of the sleeve. In some embodiments, the groove has a cross-section such that the width of the groove has a narrower section closer to the main inner surface of the fitting, and a wider section further from the main inner surface. This can be configured such that the groove has a tapered surface on at least one side, forming an edge protruding between the groove and the main internal surface of the fitting in proximity to an adjacent sealing zone. By this design, when the pressure testing chamber is pressurised, pressure is exerted not only outwardly (putting stress on the seal in the sealing zone) but pressure is also exerted on the edge inwardly, counteracting to certain extent that outwardly pressure. An example of such design is illustrated in FIG. 6.

The above described embodiments refer in particular to pressure chambers carved as grooves in the inner surface of the fitting wall. It follows however that a pressure chamber may as well be arranged by a groove in the pipe section to be inserted in the fitting. Such a groove space would have to be accurately placed to match an inlet on the mating fitting. Such embodiments are also encompassed by the present invention.

The fitting further comprises sealing means to form circumferential seals at each respective sealing zone.

The fitting also comprises at least a first cold zone in between the first pair of sealing zones, at least a second cold zone in between said second pair of sealing zones, and at least one proximal cold zone in between said first and second cold zones.

The sealing means for each respective sealing zone may be suitably selected from means for forming chemical fusion, fusion by friction welding, fusion by mirror welding and electrofusion.

In presently preferred embodiments, means for electrofusion are employed at one or more of the sealing zones. Typically, the means for electrofusion comprise a first electrofusion coil section arranged in or on the internal surface of the fitting encircling the sealing zone, and contacts for supplying electric current to the first electrofusion coil section.

In certain embodiments, the sealing means comprise second means that are different from said first means. For example, the second means may comprise an O-ring placed in a suitably sized indent in the interior surface of the sleeve tube. Such second means can be situated in the distal zone or the proximal zone of each or both respective pairs of sealing zones.

Figure 3:
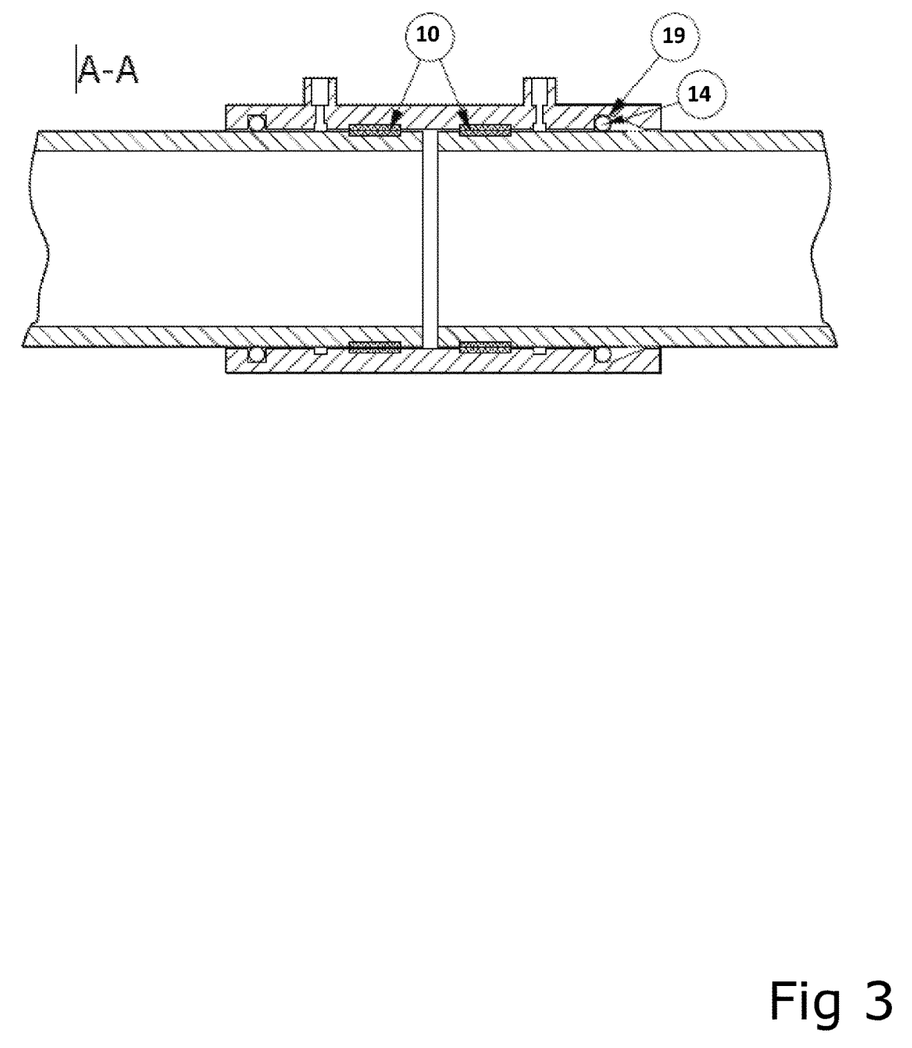
FIG. 3 shows a longitudinal cross-section of a fitting with different proximal and distal sealing zones, where the proximal sealing zones are electrofusion zones and distal sealing zones comprise an O-ring in an indent. On the right-hand side is shown a configuration with a tapered indent (19).

In one embodiment, the O-ring indent is a groove which has a tapered side distally from the pressure chamber region in between the sealing zones such that the indent gradually narrows in the direction away from the pressure chamber, such that when the chamber is pressurized the O-ring is pressed against the narrowing indent to further tighten the seal. Such tapered O-ring indent is preferably at the distal side of the distal sealing zone of one or both pairs of sealing zones. An example of such sealing is shown in FIG. 3, right hand side.

In an embodiment, the fitting has in each pair of sealing zones a first means for forming a first circular seal (proximal seal, closer to the center of the sleeve section) between the inner surface of the sleeve and the outer surface of the first and/or second pipe section. The fitting further comprises a second means for forming a second circular seal (distal seal, closer to the tubular end of the sleeve) between the inner surface of the sleeve (7) and the outer surface first and/or second pipe section.

As described in more detail herein below, the special configuration of the cold zones and sealing zones of the fittings of the present invention greatly improves flexibility in the use of the fittings. The fittings do not need clamps to maintain both pipe sections to be joined in a straight position, as the fittings can accommodate some bending/curvature, such as due to storage of pipe material in large coils.

A further very advantageous feature of the invention is the non-destructive nature of the testing of the integrity of the seals, through the arrangement of the pressure testing chambers of the fittings of the invention. The pressure testing chambers have inlets that are on the outside of the fitting and need no drilling or guiding of probes through the pipes. The inlets are in certain embodiments configured with valves, or valves can be part of external equipment used for pressure testing. The pressure testing chambers are formed in the sleeve portion of the fitting, the sleeve portion is dimensioned to allow for high pressure in the pressure chamber, allowing for testing with desired pressure. The sleeve portion typically has a wall thickness in the range of about 8-15 mm, such as preferably in the range 10-12 mm, such as about 10, 11 or 12 mm.

DESCRIPTION OF THE INVENTION

The following embodiments and definitions relate to the product and the test system of the present invention. Although most of the examples relate to electrofusion of PE pipes, other means of joining PE pipes or other pipes are anticipated by the invention, where a pressure chamber is created between two circular seals in the adjacent sealing zones and cold zones are used to enhance integrity.

In an embodiment of the present invention the first means for forming the first circular joint/seal between said inner surface of said sleeve and said outer surface of said first and/or second pipe section is means for forming a chemical fusion, friction welding, mirror welding or electrofusion.

An advantageous feature of the invention is the provision of multiple cold zones, these together with the multiple sealing zones provide for structural flexibility and thus can accommodate for some residual bending/curvature, which often is observed in pipes that have been stored coiled up. Accordingly, in an embodiment of the invention, there are provided in the fitting of the invention at least a first cold zone in between the first pair of sealing zones, a second cold zone in between the second pair of sealing zones (on the opposite end of the fitting) and at least one proximal cold zone in between said first and second cold zones. In another embodiment, there are two cold zones in between the first pair of sealing zones and two cold zones in between the second pair of sealing zones. In such embodiment, typically there is a cold zone between each sealing zone and the center of the region between the sealing zones There may further be provided two proximal cold zones in between the first and second pairs of sealing zones, such that e.g. one proximal cold zone is provided for between the fitting and each respective pipe end inserted into the fitting. In further preferred embodiments, the fitting extends beyond the distal (outer) sealing zones, to provide for further cold zones, on each end, distal to the respective pair of sealing zones. Thus, the fitting may in advantageous embodiments comprise from three and up to eight cold zones. Each cold zone preferably has a width in the range from 4 to 25 mm, more preferably a width in the range from 5 to 18 mm, or in the range from 6 to 15 mm or 5 to 15 mm, such as in the range from 8 to 12 mm, or in the range of 10-12 mm, such as e.g. 8 mm, 9 mm, 10 mm, 12 mm, 14 mm or 15 mm. The cold zones are preferably such that they fulfil the minimum parameters for cold zones designated by international standard EN 1555.

In an embodiment of the present invention the first means for forming the first circular joint/seal between said inner surface of said sleeve and said outer surface of said first and/or second pipe section is means for forming electrofusion. The means for forming electrofusion generally comprise a first electrofusion coil section and contacts for supplying the electric current to the first electrofusion coil section. Preferably each coil section in each sealing zone comprises at least 6 wire windings and more preferably at least 9 wire windings and yet more preferably at least 12 wire windings, such as 12 windings, 15 windings, 18 windings, 20 windings or 24 windings. The windings are preferably according to industry standards, such as e.g. using 1 mm copper wires, or the like.

In an embodiment of the present invention the first and/or second pipe section is a T-joint, Y-joint, an elbow, an end-cap.

In an embodiment of the present invention the first and/or second pipe section is a saddle joint.

DETAILED DESCRIPTION OF THE INVENTION

The invention will now be discussed in relation to the following drawings.

Figure 1:
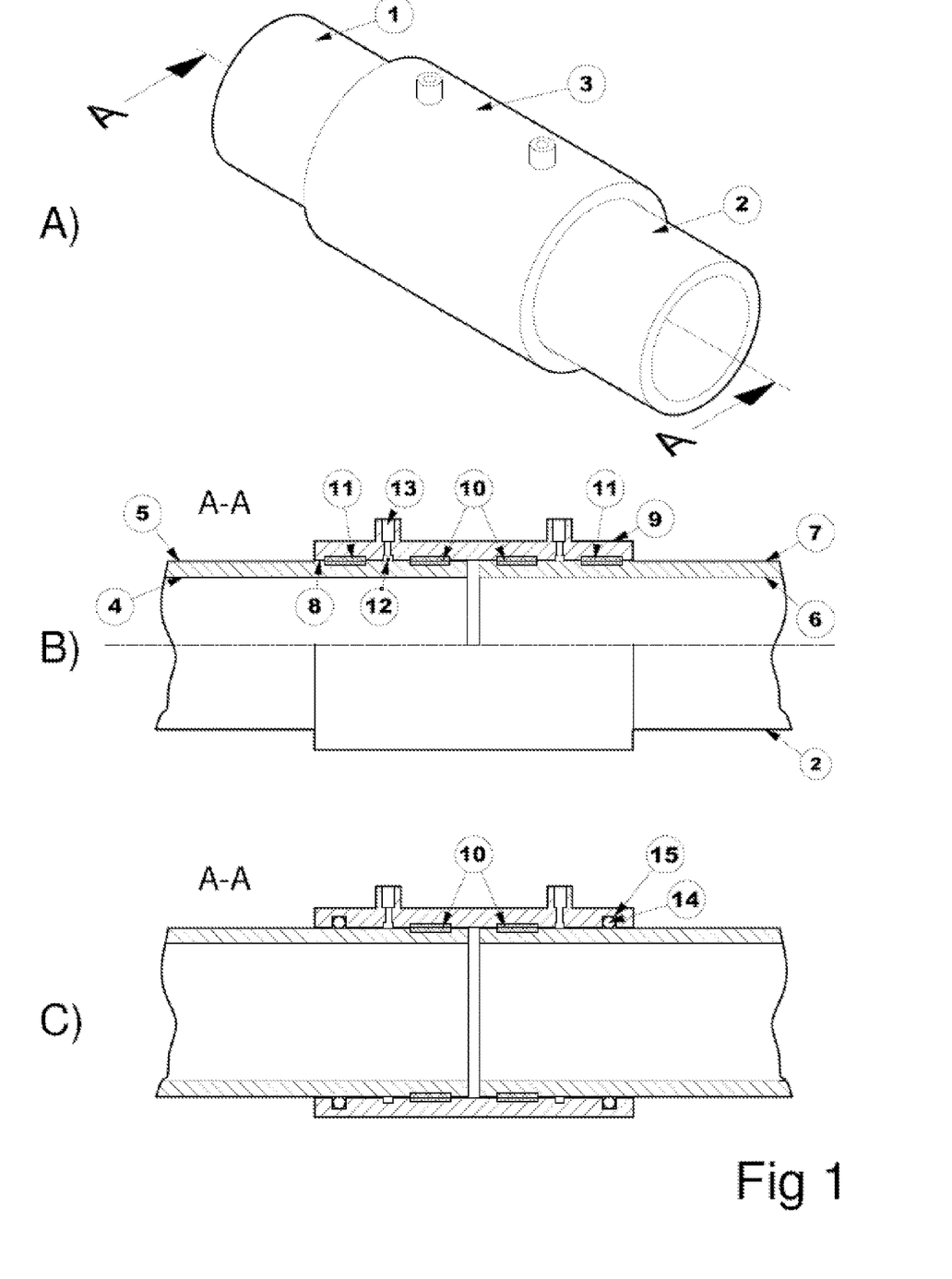
FIG. 1 shows a fitting of the invention comprising a tubular sleeve (3) to receive ends of two pipes (1,2) to be joined.

In FIG. 1A a fitting of the present invention is shown joining together two pipes. The figure shows a first pipe section 1, a second pipe section 2 and a fitting 3 for joining together the two pipes. FIG. 1B shows longitudinal cross-sectional view of FIG. 1A. The joining end of the first pipe 1 has an inner surface 4 and outer surface 5 and the joining end of the second pipe 2 end likewise has an inner surface 6 and an outer 7 surface. The fitting in this embodiment is in the form of a sleeve section 3 for receiving the joining ends of the first and second pipes. The fitting sleeve 3 has an inner surface 8 and an outer surface 9 where fusion between the fitting and each joining end of the pipes is made by generating by each pipe two circular weld zones by electrofusion, in designated sealing zones of the fitting. When electric current is supplied to an electrofusion coil, the adjacent surfaces melt together forming the first 10 and second 11 weld zones. In this configuration weld zones 10 are proximal weld zones and weld zones 11 are distal weld zones. A pressure testing chamber 12 for testing the electrofusion welding between the sleeve section 3 and each respective pipe is formed in the sleeve section in-between the first 10 and second 11 weld zones for each pipe connection to the sleeve. An inlet 13 (with an optional pressure testing valve) is arranged in the sleeve to allow pumping of air, gas or liquid into the pressure testing chamber, in order to test the integrity of electrofusion welding between the sleeve section and the pipes adjacent to the pressure testing chamber.

In FIG. 1C, the second (distal) circular seal between the inner surface 8 of the sleeve 3 and the outer surface 5,7 of pipes 1,2 is an O-ring 14 placed in an indent 15 formed in the sleeve 3. This is just one example of how the second joint/seal may be formed as an alternative to an electrofusion weld zone and should not be interpreted as limiting to other means of joining or sealing the pipes with a sleeve.

Figure 2:
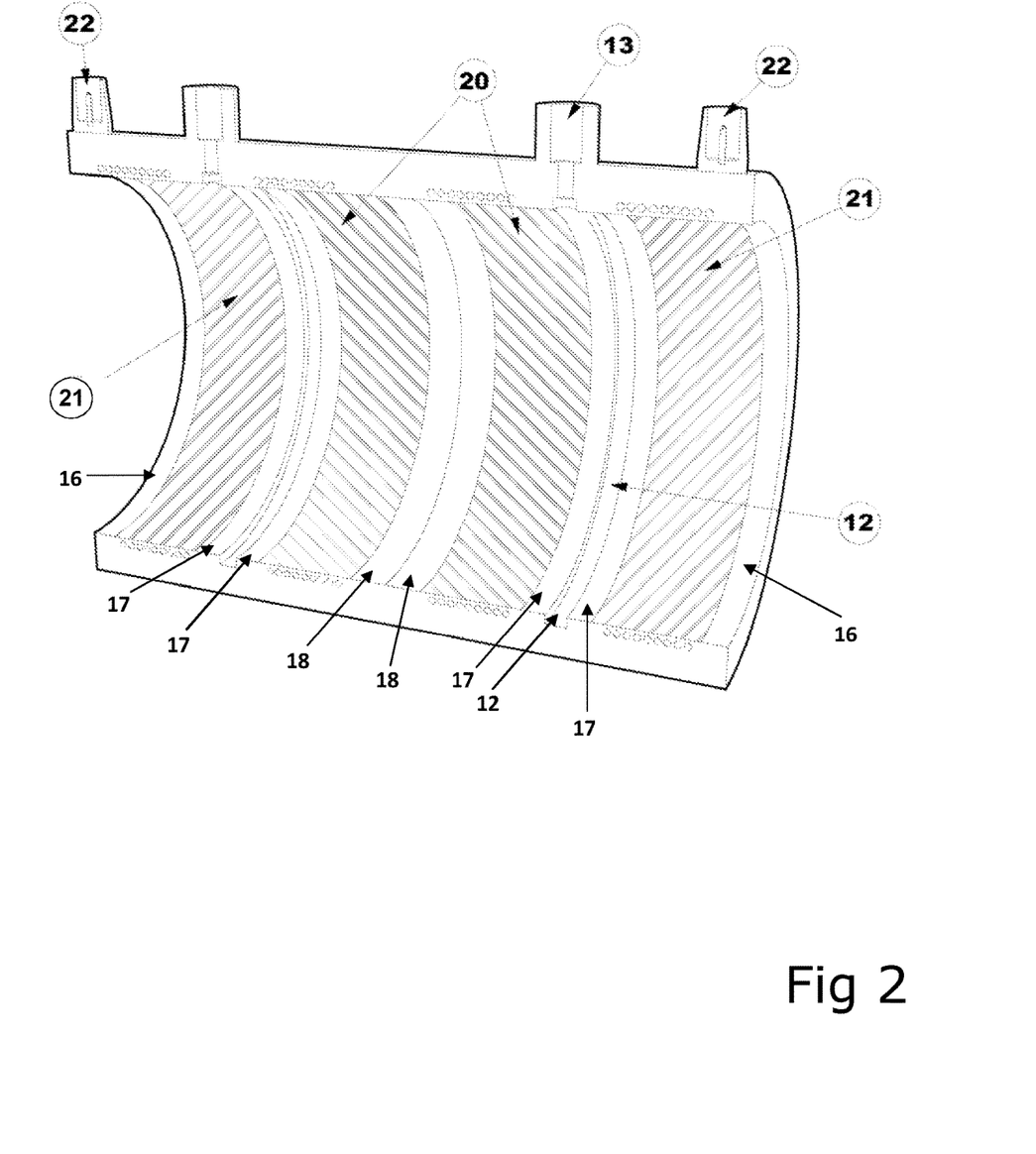
FIG. 2 shows an exploded view of a fitting of the invention, with two pairs of sealing zones (20,21) (welding zones) with electrical coils to form four weld zones and cold zones in between the weld zones of each pair of welding zones, and in between the pairs of welding zones.

FIG. 2 shows an exploded view of a sleeve fitting for joining two pipes. In this embodiment the pressure testing chamber 12 is formed in a cold zone between two weld zones generated by electrofusion. The sleeve has a first connection section 18 and a second connection section 19. Each connection section has a first electrofusion coil 20, arranged in the inside surface of the pipe end adjacent to each respective pressure testing chamber 12, in the proximal sealing zones 10. Each connection section further comprises a second electrofusion coil 21, placed distally from each respective pressure testing chamber. The coils are connected with a contact 22 for supplying electric current. The exploded view of the sleeve wall shows the wire windings of the coils, 9 windings for each coil in this embodiment. This embodiment of fitting has cold zones distally 16 of the distal sealing zones, cold zones 17 on each side of the pressure testing chamber 12 in between each pair of sealing zones, and cold zones 18, where the ends of the pipes meet in the center of the fitting.

Figure 4:
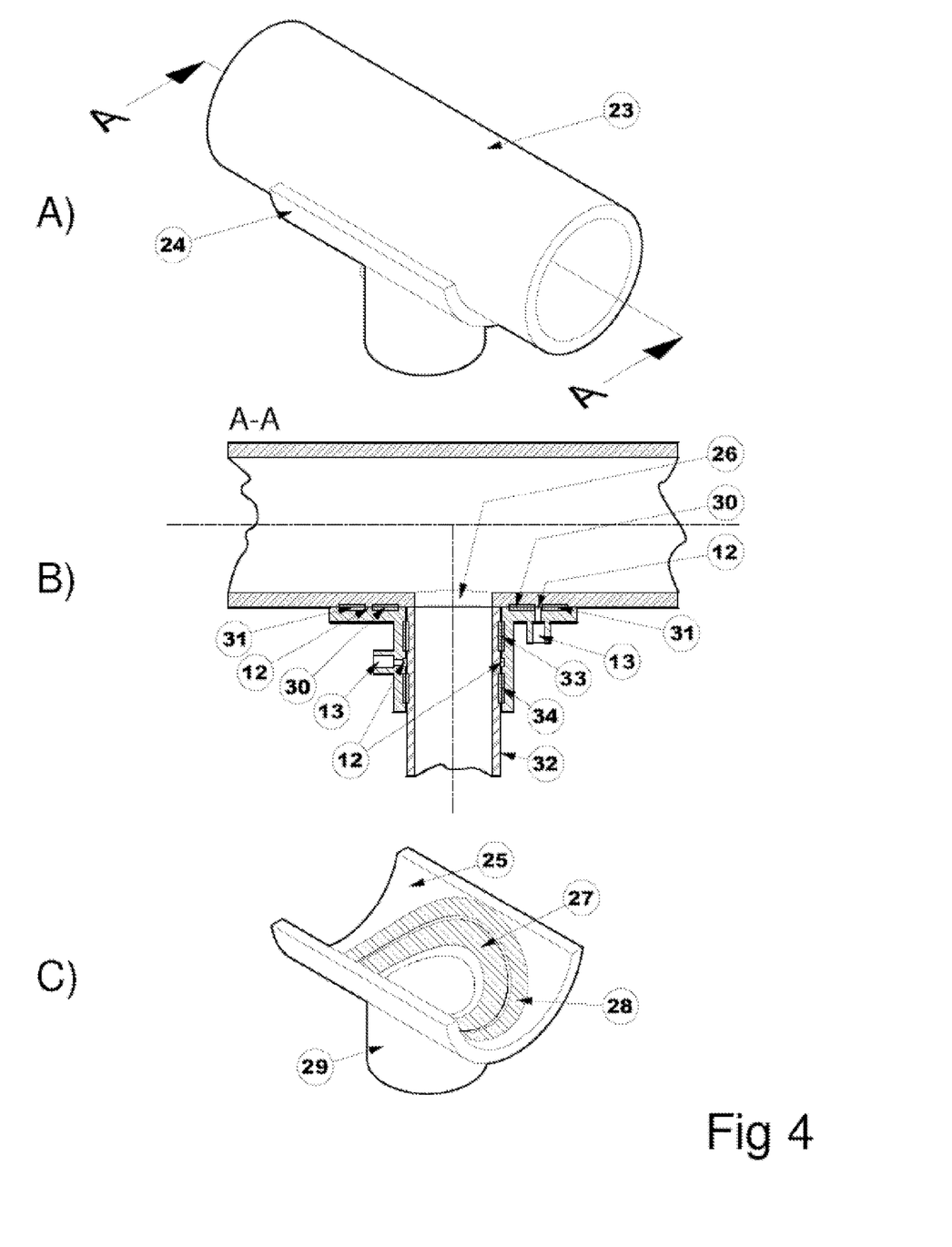
FIG. 4 shows a saddle joint fitting of the invention.

FIG. 4 shows a saddle joint fitting with pressure testing chambers of the present invention. FIG. 4A shows a pipe 23 placed on a saddle joint 24. In FIG. 4B a cross-sectional view of the pipe 23 and the saddle joint 24 is shown. The contact portion 25 of the saddle joint contacting the pipe comprises two sealing zones (27,28) from weldable material as shown in FIG. 4C, where the contact portion 25 which encloses an opening 26 in the pipe 23, has inner 27 and an outer 28 sections of circular coils for welding the saddle joint 24 to the pipe 23 around the pipe extension member 29 from the saddle joint 24. In FIG. 4B the inner 30 and outer 31 weld zones created by the inner 27 and outer 28 circular coils are shown. Between the two weld zones is a pressure testing chamber 12 with an inlet 13. The figure also shows a second pipe 32 attached to the saddle joint 24 and sealed to the joint by electrofusion. A pressure testing chamber 12 is formed in the cold zone between weld zones 33 and 34 with an inlet 13 to facilitate the pressure testing.

Figure 5:
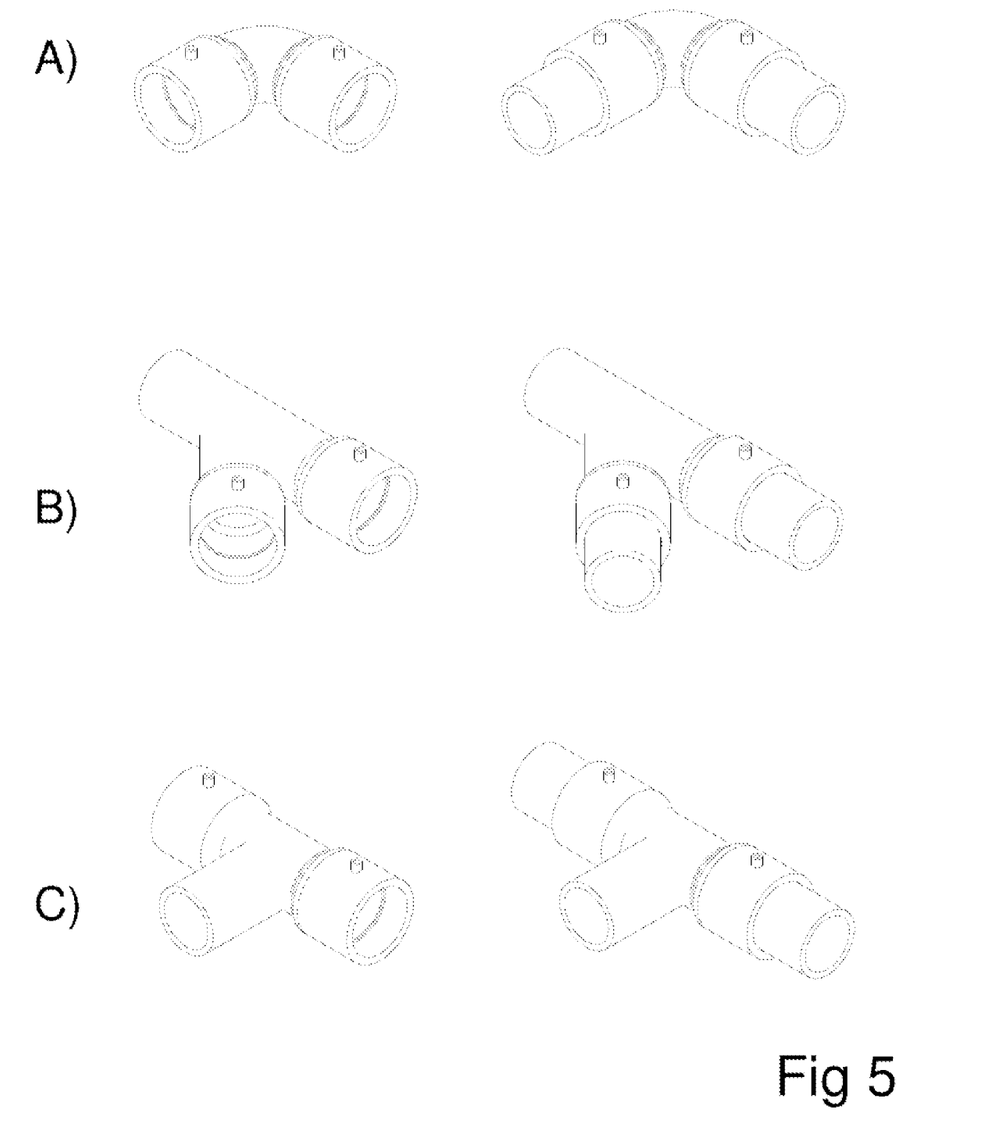
FIG. 5 shows three different types of fittings for connecting two or more pipe sections.

FIG. 5 shows different fittings of the present invention, where all the fittings have an inlet to a pressure testing chamber. FIG. 5A shows an elbow fitting (A), Y-fitting (B) and T-fitting (C), without (left) and with (B) pipes joined by the fitting.

FIG. 6 shows a cross-section of one embodiment of a so-called "omega"-shaped pressure testing chamber. The chamber groove has a wide main section 35 and narrowing edges 36. By this design less stress is created at the seal front 37 of the seal when pressure testing with high pressure, as pressure from within the groove is exerted on the edge 36 (from within the groove) counteracting pressure acting on the opposite side of the edge, from the space next to the seal front 37. Thus, net forces exerting a straining force on the seal (force pushing from each other the sealed surfaces of the pipe and fitting) is reduced. This allows even higher pressure to be used in the pressure testing, if desired.

The invention claimed is:

1. A fitting for joining together with a tight seal at least two pipe sections, the fitting comprising
a hollow tubular main body with opposite tubular sleeve openings, wherein a first tube end of a first tube and a second tube end of a second tube can be inserted in the respective opposite tubular sleeve openings,
a first pair of circumferential sealing zones comprising a proximal sealing zone and a distal sealing zone, for sealing said first tube end to the fitting, and
a second pair of circumferential sealing zones comprising a proximal sealing zone and a distal sealing zone, for sealing said second tube end to the fitting,
wherein in between said first pair of circumferential sealing zones is arranged a first circumferential pressure chamber, having an inlet, which can be used to test the integrity of seals in said first pair of sealing zones, and
wherein in between said second pair of circumferential sealing zones is arranged a second pressure chamber, having an inlet, which can be used to test the integrity of seals in said second pair of sealing zones,
sealing means to form circumferential seals at each respective sealing zone,
the fitting comprising at least a first cold zone in between said first pair of sealing zones,
and at least a second cold zone in between said second pair of sealing zones, and at least one proximal cold zone in between said first and second cold zones,
wherein the sealing means comprise first means for forming at least one circular seal, said first means selected from forming chemical fusion, fusion by friction welding, fusion by mirror welding and electrofusion,
wherein the sealing means comprise second means for forming a second circular seal between at least another of said sealing zone, wherein said second means comprise an O-ring placed in an indent formed in the fitting,
wherein said indent has a tapered side in between the sealing zones, such that the indent gradually narrows in the direction away from the pressure chamber, such that when the chamber is pressurized the O-ring is forced against the narrowing indent to further tighten the seal.

2. The fitting according to claim 1, wherein said first means are means for electrofusion.

3. The fitting according to claim 2, wherein the means for electrofusion comprise a first electrofusion coil section arranged in or on the internal surface of the fitting encircling the sealing zone, and contacts for supplying electric current to the first electrofusion coil section.

4. The fitting according to claim 1, wherein at least one of said first and second pairs of sealing zones comprise a proximal sealing zone with means for electrofusion and a distal sealing zone comprising an O-ring placed in an indent.

5. The fitting according to claim 1, wherein each cold zone has a width along the main axis of the fitting in the range of 5-15 mm and preferably in the range of 10-12 mm.

6. The fitting according to claim 1, further comprising a further tubular body section extending from sad main body from in between said two tubular openings, said further tubular body section comprising a third tubular opening, with a pair of sealing zones.

7. The fitting according to claim 6, forming a T-shaped or a Y-shaped fitting.

8. The fitting according to claim 1, wherein at least one of said pressure chamber comprise a groove cut in the inner surface of the fitting in between sealing zones on each side of the pressure chamber.

9. The fitting of claim 8, wherein said groove has a cross-section such that the width of the groove has a narrower section closer to the main inner surface of the fitting, and a wider section.

10. The fitting according to claim 1, wherein at least one of said pressure chamber is arranged as a zone with an inlet to mate with a suitably located circumferential groove in the surface of a tube section to be inserted in the fitting.

11. A fitting in the form of a saddle-type fitting, comprising
a half-tube shaped main section, dimensioned to receive in it a section of a pipe,
a tubular section extending from a circular or elliptical hole of the half-tube, at an angle to the longitudinal axis of the half-tube section,
wherein said half-tube section comprises a first pair of circular or elliptical sealing zones and first sealing means, to form circular or elliptical seals circumscribing the hole in the half-tube section and a corresponding mating hole in a mating pipe placed in the half-tube section, between the inner surface of the half-tube section and the outer surface of the mating pipe,
wherein the tubular section comprises a second pair of circular sealing zones and second sealing means to form circular seals between the inside surface of the tubular section and the outside surface of a mating pipe inserted into said tubular section,
wherein in between said first pair of circular or elliptical sealing zones is a pressure chamber, and
wherein in between said second pair circular sealing zones is a pressure testing chamber.

12. The fitting of claim 11, wherein said first and second sealing means are means to form electrofusion.

* * * * *